United States Patent
Perl

(10) Patent No.: US 8,348,591 B2
(45) Date of Patent: Jan. 8, 2013

(54) METHOD AND DEVICE FOR PACKING LARGE DRINKS PACKS

(75) Inventor: Kurt Perl, Rimsting (DE)

(73) Assignee: Krones AG (DE)

( * ) Notice: Subject to any disclaimer, the term of this patent is extended or adjusted under 35 U.S.C. 154(b) by 304 days.

(21) Appl. No.: 12/524,715

(22) PCT Filed: May 14, 2008

(86) PCT No.: PCT/EP2008/055897
§ 371 (c)(1),
(2), (4) Date: Sep. 15, 2009

(87) PCT Pub. No.: WO2008/138947
PCT Pub. Date: Nov. 20, 2008

(65) Prior Publication Data
US 2010/0129188 A1    May 27, 2010

(30) Foreign Application Priority Data

May 14, 2007  (DE) .......................... 10 2007 022 909
Dec. 27, 2007  (DE) .......................... 10 2007 063 286

(51) Int. Cl.
*B65H 29/34*   (2006.01)
*B65G 61/00*   (2006.01)
*B65G 57/02*   (2006.01)

(52) U.S. Cl. .................. 414/789.5; 414/799; 414/794.2; 414/927; 414/923

(58) Field of Classification Search ............... 414/788.9, 414/789.3, 789.5, 789.8, 789.9, 790.2, 791.6, 414/792.6, 792.9, 793.4, 793.5, 794, 796.2, 414/796.3, 796.9, 797.2, 799, 900, 922, 924, 414/927, 929
See application file for complete search history.

(56) References Cited

U.S. PATENT DOCUMENTS

| | | | | |
|---|---|---|---|---|
| 3,643,822 A * | 2/1972 | Birchall | .................. | 414/802 |
| 4,787,810 A * | 11/1988 | Cawley et al. | ................. | 414/591 |
| 5,375,493 A | 12/1994 | Focke et al. | ..................... | 83/94 |
| 5,507,616 A * | 4/1996 | Perobelli et al. | ........... | 414/789.5 |
| 5,720,592 A * | 2/1998 | Gillingham et al. | ........ | 414/789.5 |
| 6,658,816 B1 * | 12/2003 | Parker et al. | ..................... | 53/397 |
| 2005/0265817 A1 * | 12/2005 | Blanc | ........................... | 414/799 |

FOREIGN PATENT DOCUMENTS

DE          29 45 883         5/1981
DE       G 92 02 553.6       11/1992
(Continued)

OTHER PUBLICATIONS

Chinese Office Action, dated Sep. 26, 2011 (11pgs).

(Continued)

*Primary Examiner* — Gregory Adams
(74) *Attorney, Agent, or Firm* — Hayes Soloway P.C.

(57) ABSTRACT

A device for forming stacks of piece goods batches, includes a movable transport device for transporting the piece goods batch. A feed device feeds the piece goods batch to the transport device. The transport device includes a support device which at least intermittently supports the piece goods batch and relative to which the piece goods batch can move and which can be removed essentially completely from a region located below the piece goods batch. The transport device includes at least one controllable fixing device for temporarily fixing an intermediate layer, wherein the fixing device for fixing the intermediate layer moves below the piece goods batch.

14 Claims, 4 Drawing Sheets

FOREIGN PATENT DOCUMENTS

| | | |
|---|---|---|
| DE | 42 06 038 | 9/1993 |
| DE | 42 07 808 | 9/1993 |
| DE | 200 21 874 | 8/2002 |
| DE | 197 32 243 | 2/2003 |
| DE | 20 2006 018 017 | 4/2007 |
| EP | 221408 A * | 5/1987 |
| EP | 1457442 A1 * | 9/2004 |
| EP | 1724219 A2 * | 11/2006 |
| EP | 1 927 562 | 6/2008 |
| FR | 2 878 238 | 5/2006 |
| GB | 2 066 201 | 7/1981 |
| WO | WO 02/02446 | 1/2002 |
| WO | WO 2006000847 A2 * | 1/2006 |

OTHER PUBLICATIONS

European Office Action, dated Feb. 29, 2012 (3 pgs).

* cited by examiner

METHOD AND DEVICE FOR PACKING LARGE DRINKS PACKS

FIELD OF THE INVENTION

The present invention relates to a device and a method for palletising piece goods batches.

BACKGROUND OF THE INVENTION

Palletisers are known from the prior art. In order to load a pallet, firstly an empty pallet is prepared in a loading station and then packs such as for example drinks crates, disposable containers or the like are deposited on said pallet in layers. Usually intermediate layers of paper or cardboard for example are arranged between individual layers of packs.

DE 29 45 883 A1 discloses a device for loading pallets with piece goods. This device has support rails which run transversely to a layer transfer direction and in which a support plane is guided.

G 92 02 553.6 discloses a device for breaking up and forming piece goods stacks. This device comprises a plurality of vacuum grippers which grip the piece goods themselves from above. Provided below these vacuum grippers is a support plane in the form of a roller conveyor, which can be displaced below the piece goods layer. Also provided are clamping bars for clamping the piece goods layers.

It is also known from the prior art that such palletising systems in each case arrange in sequence an intermediate layer, then a layer of packs and then again an intermediate layer, one on top of the other. However, this method is relatively time-consuming.

The object of the present invention is therefore to provide a palletising system which allows a higher palletising speed.

SUMMARY OF THE INVENTION

A device according to the invention for forming stacks of piece goods batches comprises a movable transport device for transporting the piece goods batches. Also provided is a support device which can move below the piece goods batch and which can be removed essentially completely from a region located below the piece goods batch. According to the invention, the transport device comprises at least one controllable fixing device for temporarily fixing an intermediate layer, wherein this fixing device for fixing the intermediate layer can move below the support device.

It is therefore proposed according to the invention that the transport device for the piece goods batches or the layers of packs is combined with a fixing device for the intermediate layer that is to be arranged between the layers of packs. In this way, a stack can be formed more quickly using just one device. As mentioned above, the piece goods batches are the layers of packs that are to be palletised. For the palletising, firstly an intermediate layer can be deposited for example using the device according to the invention, and then a piece goods batch can be deposited above the intermediate layer without any loss of time. This process can then be repeated. A significant acceleration can thus be achieved compared to methods known to date, and advantageously no additional movement devices are required for the insertion of the intermediate layers.

Preferably, the feed device feeds the piece goods batch to the transport device in a transverse direction, i.e. the piece goods batch is guided essentially in a horizontal direction. The transport device preferably has a side opening, through which the piece goods batch can be pushed into the transport device. A movement below the piece goods batch is understood to mean that the fixing device can be moved into a position which is located lower than the piece goods batch. It is also conceivable that the fixing device is moved within a region located below the piece goods batch.

A fixing device is understood to mean a device which is able to hold an intermediate layer at least temporarily on the transport device.

Preferably, the fixing device is integrated in the support device in such a way that its movement is coupled to the movement of the support device. For the method according to the invention, therefore, it is possible firstly to deposit an intermediate layer and then to remove the support device together with the fixing device from the region below the piece goods batch. Preferably, the fixing device for carrying out the fixing process is arranged in a region located below the support device, so that the intermediate layer can be held below the piece goods batch.

In a further advantageous embodiment, the support device comprises a plurality of rotatable bodies, against which the piece goods batch can be supported. As mentioned above, it is necessary in one method step to move the support device relative to the piece goods batch. In order to prevent any tearing for example of films enclosing packs during this process, the aforementioned freely rotatable bodies are provided, which allow a rolling relative to the piece goods batch.

In a further advantageous embodiment, the support device can be moved relative to the piece goods batch in the plane of a bottom face of the piece goods batch. More specifically, it is possible to displace the support device in a curtain-like manner relative to the piece goods batch. For this purpose, the rotatable bodies or shafts or spindles carrying these rotatable bodies are guided in rails on two sides.

In a further advantageous embodiment, the fixing device comprises at least one fixing element which is arranged between two rotatable bodies. More specifically, the fixing elements are integrated in the curtain formed of a plurality of rotatable bodies.

In a further advantageous embodiment, the fixing device comprises a strip-shaped body which can be moved in two side rails together with the rotatable bodies. This means that such a strip-shaped body can be arranged for example between two rotatable bodies and thus can be displaced together with these rotatable bodies relative to the piece goods batch.

In a further advantageous embodiment, at least one fixing element is a controllable suction head. It is thus proposed to attach at least one such suction head in the support device, which is preferably configured as a shutter. In addition, however, it would also be possible to attach a fixing device, for example in the form of a clamping device, below the support device. A controllable suction head is understood to mean that the fixing process can be controlled by the user or by a machine control, so that an intermediate layer that is to be lifted can selectively be picked up and released.

In a further preferred embodiment, the fixing device comprises two strip-shaped bodies which are spaced apart from one another, wherein at least one fixing element is arranged on each of these strip-shaped bodies, and wherein a plurality of rotatable bodies is provided between these two strip-shaped bodies.

Preferably, each of these strip-shaped bodies also has at least two such fixing elements. In this way, a plurality of such fixing elements can advantageously be distributed essentially uniformly over the largest possible surface area of the intermediate layers, so that a particularly efficient holding of the intermediate layers is possible.

In a further advantageous embodiment, the support device comprises two sub-sections which are essentially symmetrical to one another. In order to open the bottom of the transport device, these two sub-sections are moved apart and in this way allow access to the region below the piece goods batch.

In a further advantageous embodiment, the transport device in its entirety is arranged on an arm which can pivot about a vertical axis. In this way, the transport device can grip piece goods batches and deposit said batches at a different location, for example on a pallet.

In a further advantageous embodiment, the device comprises an approaching unit which makes the intermediate layers approach an underside of the support device. This means that the transport device can pick up both the piece goods batch and the intermediate layer without having to be moved over considerable distances, as a result of which short cycle times can be achieved.

In a further preferred embodiment, the transport device comprises a coupling device which in one operating state is in fluid connection with the fixing device and which in a further operating state of the fixing device is separated from the latter. More specifically, this coupling device serves to apply a vacuum to the fixing elements on the support device, which fixing elements are designed as suction heads. In a closed state of the support device or of the roller conveyor, the coupling device docks with the suction strips of the support device and then a vacuum can be applied thereto.

This coupling device is preferably also used to apply compressed air intermittently to the suction heads, in order in this way to detach the respective intermediate layer from the suction heads. The coupling device is preferably designed in a pivotable manner and by virtue of this pivoting process can be applied to the strips or moved away therefrom.

The present invention also relates to a transport device for transporting the piece goods batch, comprising a support device which can be moved below the piece goods batch and which can be removed essentially completely from a region located vertically below the piece goods batch.

According to the invention, the transport device comprises at least one controllable fixing device for temporarily fixing an intermediate layer, wherein this fixing device for fixing the intermediate layer can move below the piece goods batch, and wherein the fixing device is integrated in the support device in such a way that its movement is coupled to the movement of the support device.

The present invention also relates to a method for forming stacks of piece goods batches. In one method step, the piece goods batch is introduced into a transport device, wherein the piece goods batch is moved relative to a support device of the transport device and is displaced on this support device. In a further method step, the transport device is transported, wherein during transport the piece goods batch is supported by the support device.

According to the invention, an intermediate layer is at least intermittently held by the transport device by means of a fixing device arranged on the transport device and preferably on the support device.

In the method according to the invention, therefore, both the piece goods batch itself and also the intermediate layer are gripped by the same transport device, so that a time saving is also possible here too.

Preferably, the transport device itself is moved with the piece goods batch and with the intermediate layer by a lifting movement and optionally also by a pivoting movement in order to deposit the intermediate layer and the piece goods batch for example onto a pallet.

In one preferred method, the fixing device is moved together with the support device relative to the piece goods batch. In this case, therefore, the fixing device is also coupled to the support device, so that in this way the entire movement process can be simplified.

BRIEF DESCRIPTION OF THE DRAWINGS

Advantageous embodiments and further developments will emerge from the appended drawings.

In the drawings.

DETAIL DESCRIPTION OF PREFERRED EMBODIMENT

Figure 1:
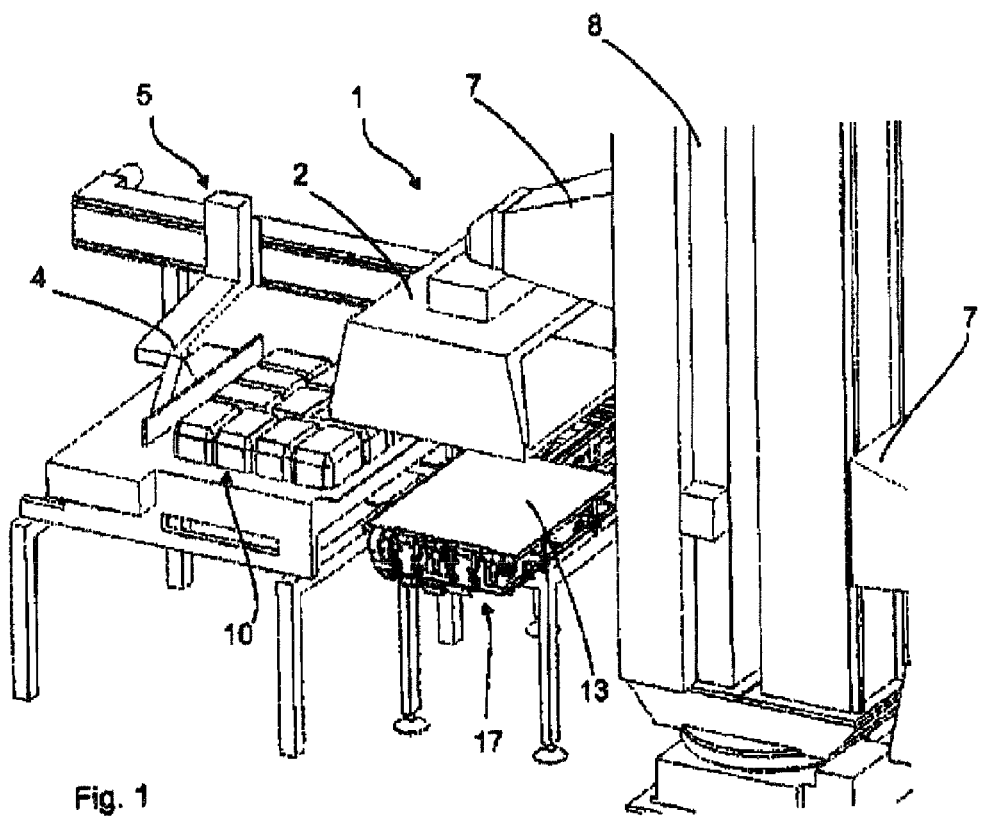
FIG. 1 shows a diagram of a device according to the invention.

FIG. 1 shows a device 1 according to the invention for forming stacks of piece goods batches 10. Here, reference 4 denotes a pushing device which forms part of a feed device and which pushes the piece goods batches 10 into a transport device 2. In addition, intermediate layers 13 are also made to approach this transport device 2 from below.

The transport device 2 is arranged in a preferably rotatable manner on an arm 7. This arm 7 is in turn arranged on a central rotatable frame 8. In this way, the received piece goods batches 10 can be conveyed together with an intermediate layer 13 onto a pallet. A further corresponding arm 7, on which a further transport device 2 is provided, can be seen to some extent on the right-hand side in FIG. 1.

Figure 2:
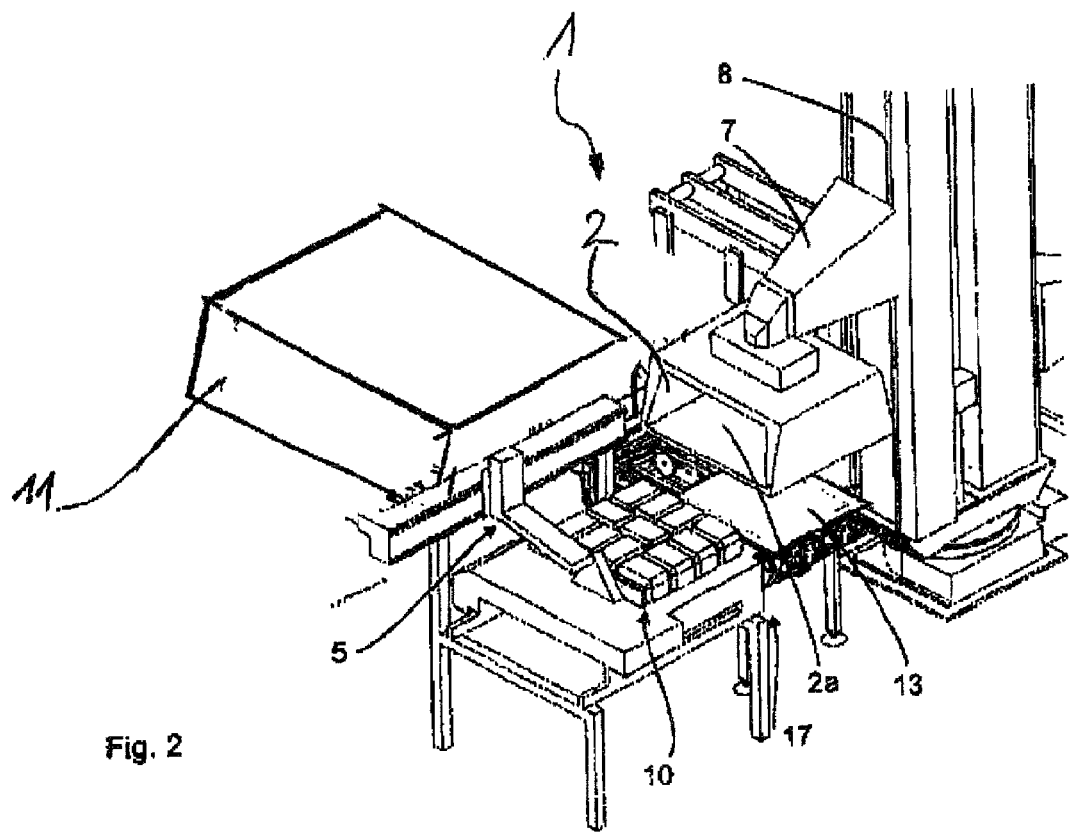
FIG. 2 shows a further diagram of a device according to the invention.

FIG. 2 shows a further view of the device 1 shown in FIG. 1. A reservoir 11 (shown only schematically) for intermediate layers 13 can additionally also be seen here.

It can be seen that the piece goods batches 10 are pushed into the transport device 2 from the side. For this purpose, the transport device 2 has a side opening 2a. The transport device 2 itself approaches the intermediate layers 13 from above.

Figure 3:
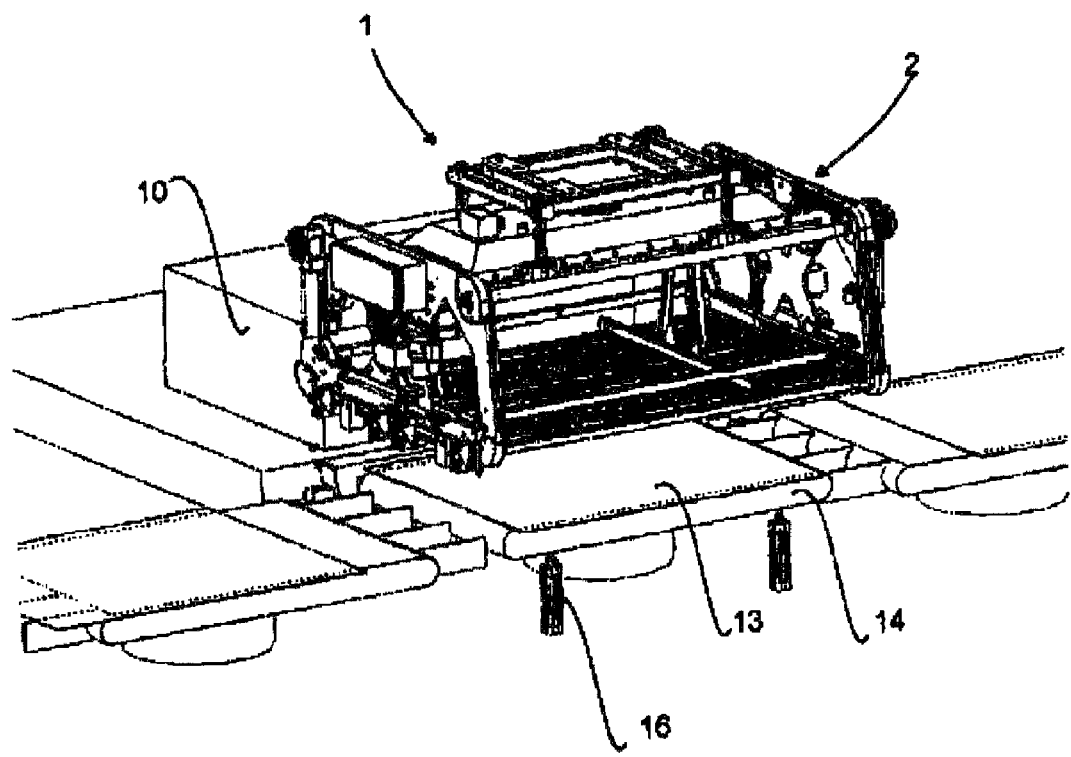
FIG. 3 shows a further diagram of a device according to the invention.

FIG. 3 shows a further view of a device 1 according to the invention. It can be seen here that the intermediate layers 13 are temporarily deposited on a table 14, before they are gripped by a transport device 2. This table 14 can be adjusted in terms of its height by means of cylinders 16 which can be actuated in a controlled manner, in order to make an intermediate layer approach the transport device 2 from below.

Figure 4:
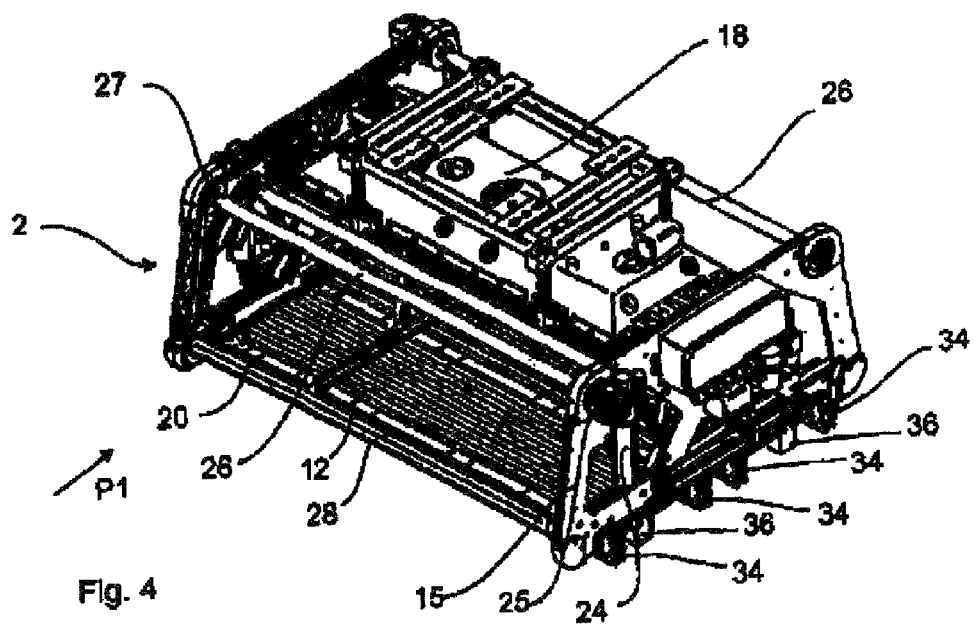
FIG. 4 shows an overall view of a transport device according to the invention.

FIG. 4 shows a transport device 2 according to the invention. Said transport device comprises two side parts 15, between which a support device 6 is arranged. This support device 6 comprises a plurality of rotatable bodies 12. For transport purposes, a piece goods batch or layer of packs is pushed laterally into the transport device 2 in the direction of the arrow P and during this process the rotatable bodies 12, which are rollers, are rotated. Once the piece goods batch has been pushed into the transport device 2, the transport device can transport the piece goods batch.

Also provided is a displaceable rod 28 which is able to align the piece goods batch in the interior of the transport device 2 in the direction of the arrow P1. For this purpose, the rod 28 can be displaced in a rail in the direction of the arrow P1. While the piece goods batch is being introduced, the rod 28 is moved aside in the upward direction so as not to hinder the introduction of the piece goods batch.

Reference 26 denotes a shaft arranged between the two side parts 15. This shaft is rotated by a motor 24 and a gear mechanism 25. By means of this shaft 26 and two toothed wheels 27 arranged thereon (only one toothed wheel is visible), the support device 6 can be moved via an open chain and thus the region below the piece goods batch is cleared. A corresponding shaft 26 is also provided at the rear side of the transport device 2 in FIG. 4.

Via a carrier 18, the transport device 2 can be arranged on a pivoting arm. The device furthermore comprises a rail, in which the support device 6 can be displaced in order to open the region which is closed by the support device 6 in FIG. 1. Reference 34 denotes the abovementioned coupling devices for applying a vacuum to the strip-shaped bodies or suction strips 20. Here, these coupling devices 34 are configured in such a way that they apply a vacuum to the suction strips only in the closed state of the support device, which is shown in FIG. 1.

Once the piece goods batch has been pushed into the transport device 2, or even before this, in the closed state shown in FIG. 1 the suction strips 20 can be activated via the coupling devices 34 in order to apply a suction to and pick up an intermediate layer arranged below the transport device 2 and then transport this intermediate layer together with the piece goods batch 2. A considerable saving in terms of cost and time is achieved as a result of this joint transport.

Figure 5:
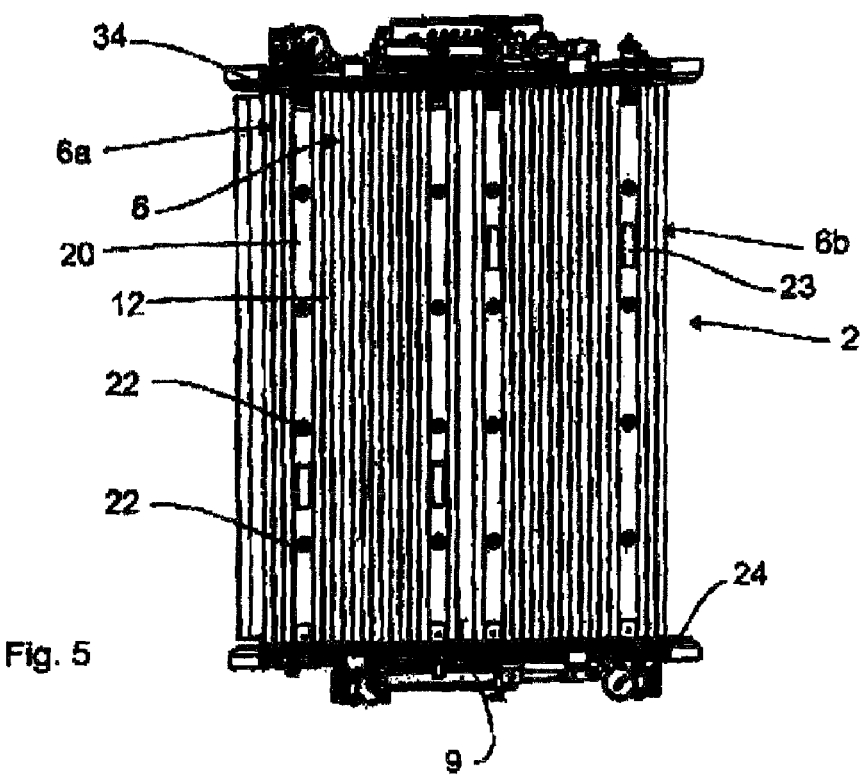
FIG. 5 shows a plan view from below of a transport device according to the invention.

FIG. 5 shows a plan view from below of a transport device 2 according to the invention. It can be seen that here four strip-shaped bodies or suction strips 20 are integrated in the support device 6. These strip-shaped bodies 20 are in each case arranged between rotatable bodies 12. The strip-shaped bodies 20 are preferably arranged relative to the rotatable bodies in such a way that the strip-shaped body 20 does not come into contact with the piece goods batch in the upward direction. In the embodiment shown in FIG. 2, the support device 6 is composed of two sub-sections 6a and 6b which are arranged essentially symmetrically to one another.

In order to deposit the piece goods batch at its target location, the two sub-sections 6a, 6b are moved apart from one another so that an opening 9 is cleared between the two sub-sections 6a, 6b, through which opening the piece goods batch can drop downwards. In the embodiment shown in FIG. 2, a total of four strip-shaped bodies 20 are provided, on which in turn a plurality of fixing elements or suction elements 22 is provided. By virtue of the arrangement shown in FIG. 2, a very uniform distribution of these suction heads 22 over the entire surface area of the transport device 2 is achieved.

It is thus possible to apply suction to the intermediate layers directly below the loading surface during loading of the shutter head (i.e. of the transport device 2) by the transport device 2. When depositing the piece goods batch on the pallet, the intermediate layer and the layer of packs can thus be deposited by approaching from just one position.

Here too, reference 34 denotes a coupling device for applying a vacuum to the strip-shaped bodies 20 and thus also to the individual suction elements 22. Reference 23 denotes sensor devices which detect the presence of intermediate layers. These may be for example tactile sensors or light sensors.

Figure 6:
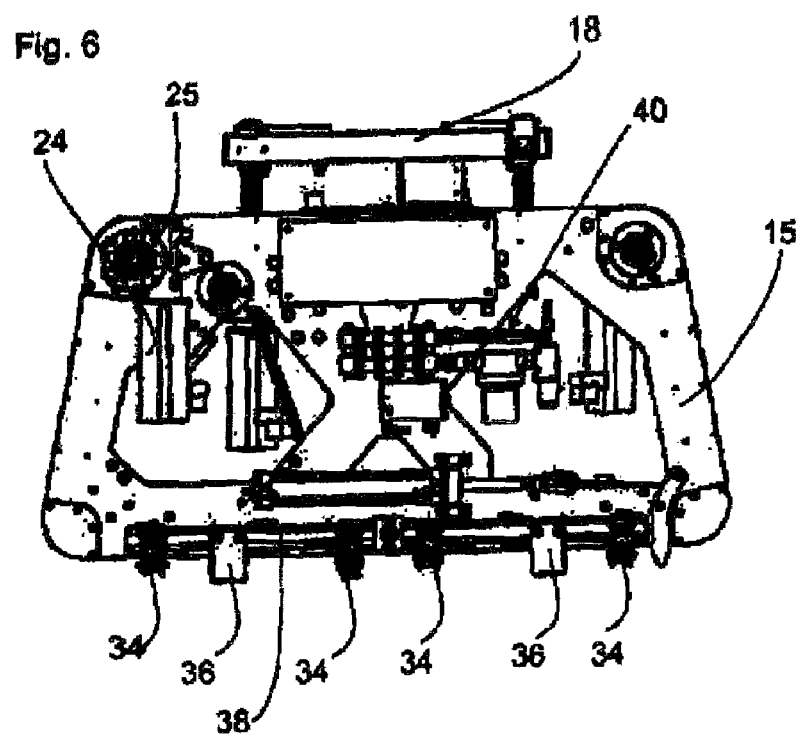
FIG. 6 shows a side view of a transport device according to the invention.

FIG. 6 shows a side view of a transport device 2 according to the invention. Here, it is also possible to see support bodies 36 which serve as a transport securing means to avoid any damage in particular to the coupling devices 34. Once this has taken place, suction is applied to the intermediate layers by the suction elements shown in FIG. 5. Reference 40 denotes a vacuum distribution device which applies a vacuum to the individual strip-shaped bodies 20 shown in FIG. 2. In addition, compressed air can also be discharged via this vacuum distribution device 40 to the coupling devices 34 and thus the suction elements 22.

Figure 7:
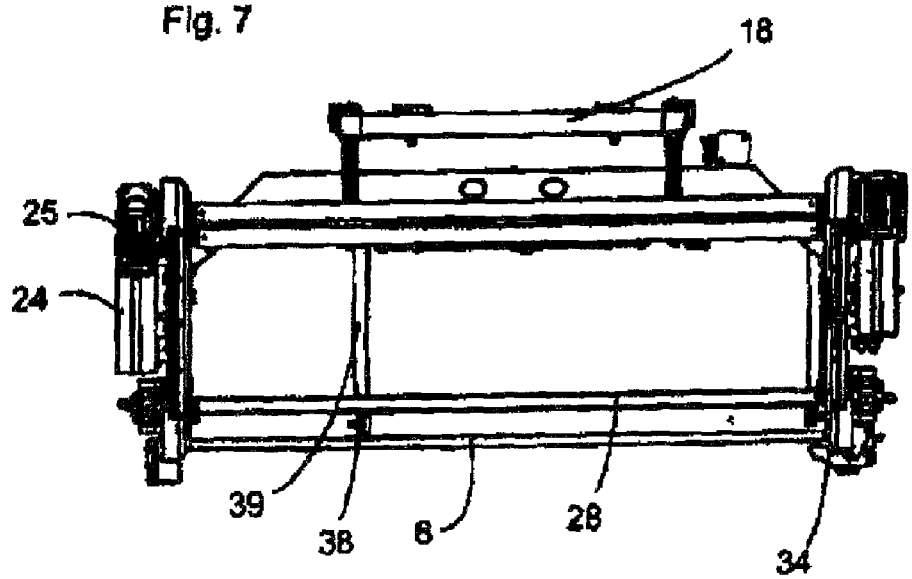
FIG. 7 shows a further side view of a transport device according to the invention.

FIG. 7 shows a further side view of a transport device according to the invention. It is possible to see here in particular a further displacement device 38 which serves for the lateral alignment of the batch of packs. This further displacement device 38 is arranged on a carrier 39. A further displacement device (not shown) is provided on the opposite side of the transport device 2.

Reference 28 once again denotes the rod which prevents the packs from falling out of the transport device 2.

Figure 8:
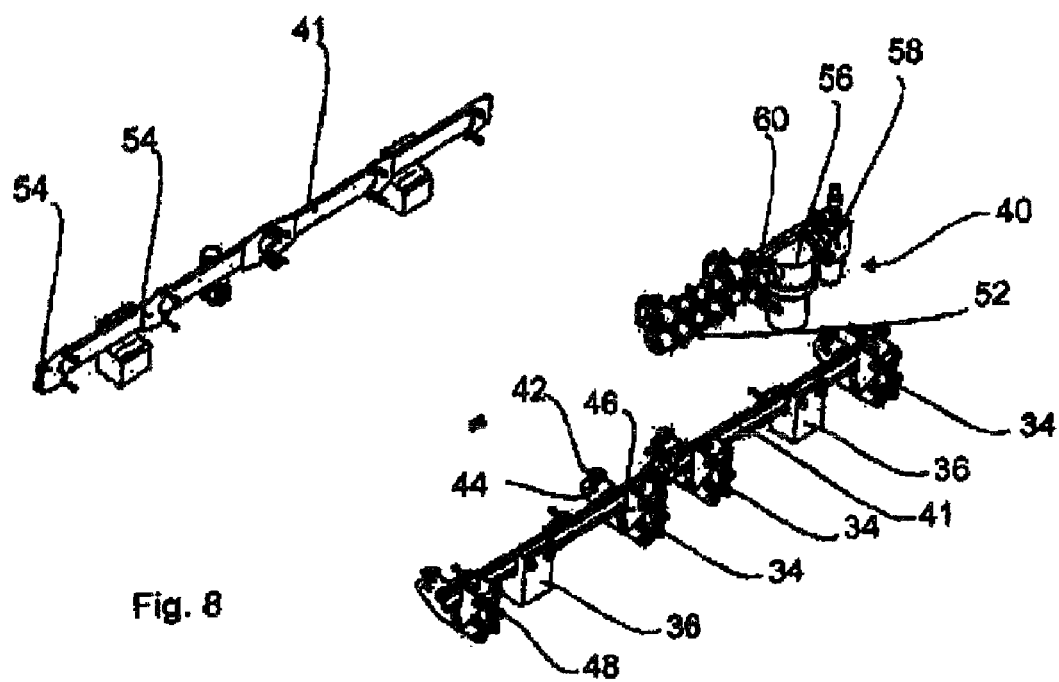
FIG. 8 shows a detailed view of a fixing device.

FIG. 8 illustrates the supply of the vacuum to the strip-shaped bodies (not shown) from FIG. 2. Here, a total of four coupling devices are provided which apply the vacuum to the strip-shaped bodies 20. In the embodiment shown in FIG. 5, these coupling devices 34 are arranged on a common carrier 41. This carrier 41 is in turn arranged via connection devices 54 on the side parts 15 of the transport device shown in FIG. 1. The coupling devices 34 have coupling heads 42 which can be pivoted downwards.

For this purpose, these coupling heads 42 are arranged on a cantilever arm 44 which is in turn arranged such that it can pivot relative to a carrier 46. Reference 48 denotes a connection, via which a vacuum can be applied to the coupling head 42 via a hose for example. Compressed air can also be supplied via this hose.

Here too, reference 40 denotes the vacuum distribution device, but this is not arranged at the position shown in FIG. 8 but rather preferably below the carrier 41. This vacuum distribution device 40 has a plurality of outputs 52, to which the abovementioned hoses for supplying the individual coupling heads 42 can be connected. By applying a vacuum to the coupling heads 42, suction can be applied to an intermediate layer as mentioned above. In order to lower the intermediate layer, this vacuum is removed and preferably compressed air is additionally output. The support device 6 can then be moved relative to the coupling heads 42. It is thus possible to keep the coupling heads 42 and the entire coupling device 34 stationary and thus make it less susceptible to wear. Reference 56 denotes a filter, downstream of which a Venturi nozzle 58 is connected. The vacuum distribution device 40 is supplied with compressed air via a connection 60.

All of the features disclosed in the application documents are claimed as essential to the invention in so far as they are novel individually or in combination with respect to the prior art.

Instead of rotatable rollers or rolls, the support device 6 of the transport device 2 may be formed of non-rotatable strips, rods or lamellae. A split plate is also conceivable, the halves of which are mounted in such a way that they can be moved away from and towards one another in a controlled manner.

The invention claimed is:

1. A device for forming stacks of piece goods batches, comprising a movable transport device for transporting the piece goods batch, and comprising a feed device which feeds the piece goods batch to the transport device, wherein the transport device comprises a support device which at least intermittently supports the piece goods batch and relative to which the piece goods batch can move and which can be removed essentially completely from a region located below the piece goods batch, wherein the transport device comprises at least one controllable fixing device for temporarily fixing an intermediate layer, wherein the at least one controllable fixing device for fixing the intermediate layer is moveable below the piece goods batch, and the at least one controllable fixing device for fixing the intermediate layer is integrated in the support device such that its movement is coupled to the movement of the support device so that the support device is removable together with the fixing device from the region below the piece goods batch, and wherein the support device is comprised of two sub-sections which are arranged essentially symmetrically to one another, and wherein at least one fixing element is a controllable suction head.

2. The device according to claim 1, wherein the support device comprises a plurality of rotatable bodies, against which the piece goods batch can be supported.

3. The device according to claim 1, wherein the support device can be moved relative to the piece goods batch in the plane of a bottom face of the piece goods batch.

4. The device according to claim 1, wherein the fixing device comprises at least one fixing element which is arranged between two rotatable bodies.

5. The device according to claim 1, wherein the fixing device comprises a strip-shaped body which can be moved in two side rails together with the rotatable bodies.

6. The device according to claim 5, wherein the fixing device comprises two strip-shaped bodies which are spaced apart from one another, wherein at least one fixing element is arranged on each of these strip-shaped bodies, and wherein a plurality of rotatable bodies is provided between these two strip-shaped bodies.

7. The device according to claim 1, wherein the transport device is arranged on an arm which can pivot about a vertical axis.

8. The device according to claim 1, wherein the device comprises an approaching unit which makes the intermediate layers approach an underside of the support device.

9. The device according to claim 1, wherein the transport device comprises a coupling device which in one operating state of the transport device is in fluid connection with the fixing device and which in a further operating state of the fixing device is separated from the latter.

10. The device according to claim 9, wherein the coupling device is pivotable.

11. The device according to claim 1, wherein the fixing device for carrying out the fixing process is arranged in a region located below the support device, so that the intermediate layer can be held below the piece goods batch.

12. A transport device for transporting piece goods batches, comprising a support device, relative to which the piece goods batch can move and which can be removed essentially completely from a region located below the piece goods batch, wherein the transport device comprises at least one controllable fixing device for temporarily fixing an intermediate layer, wherein the at least one controllable fixing device for fixing the intermediate layer is moveable below the piece goods batch, and wherein the fixing device is integrated in the support device in such a way that its movement is coupled to the movement of the support device, and the at least one controllable fixing device for fixing the intermediate layer is integrated in the support device such that its movement is coupled to the movement of the support device so that the support device is removable together with the fixing device from the region below the piece goods batch, and wherein the support device is comprised of two sub-sections which are arranged essentially symmetrically to one another, and wherein at least one fixing element is a controllable suction head.

13. A method for forming stacks of piece goods batches, comprising the steps:
introducing the piece goods batch into a transport device, wherein the piece goods batch is displaced relative to a support device of the transport device and on the support device;
transporting the piece goods batch, wherein during transport the piece goods batch is supported by the support device,
wherein an intermediate layer is at least intermittently held by the transport device by a fixing device arranged on the support device, and the fixing device for fixing the intermediate layer is integrated in the support device such that its movement is coupled to the movement of the support device so that the support device is removable together with the fixing device from the region below the piece goods batch, and wherein the support device is comprised of two sub-sections which are arranged essentially symmetrically to one another, and wherein at least one fixing element is a controllable suction head.

14. The method according to claim 13, wherein the fixing device is moved together with the support device relative to the piece goods batch.

* * * * *